(12) United States Patent
Yano (10) Patent No.: US 6,927,935 B2
(45) Date of Patent: Aug. 9, 2005

(54) METHOD AND APPARATUS FOR HEAD POSITIONING USING SERVO CONTROL IN A DISK DRIVE

(75) Inventor: Koji Yano, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/804,118

(22) Filed: Mar. 19, 2004

(65) Prior Publication Data

US 2004/0212917 A1 Oct. 28, 2004

(30) Foreign Application Priority Data

Apr. 25, 2003 (JP) .......... 2003-122347

(51) Int. Cl.$^7$ .......... G11B 5/55
(52) U.S. Cl. .......... 360/78.07; 360/78.08; 360/78.14
(58) Field of Search .......... 360/78.07, 75, 360/78.04, 78.06, 78.08, 78.14

(56) References Cited

U.S. PATENT DOCUMENTS

| | | | |
|---|---|---|---|
| 4,920,462 A | | 4/1990 | Couse et al. |
| 5,384,671 A | * | 1/1995 | Fisher .......... 360/78.14 |
| 5,636,075 A | * | 6/1997 | Nishimura et al. .......... 360/78.14 |
| 5,963,392 A | * | 10/1999 | Sri-Jayantha et al. .... 360/78.04 |
| 6,246,537 B1 | * | 6/2001 | Shirane .......... 360/78.08 |
| 6,437,935 B1 | * | 8/2002 | Johnson et al. .......... 360/78.04 |
| 6,594,105 B1 | | 7/2003 | Brittner |
| 6,716,508 B2 | * | 4/2004 | Nagata et al. .......... 428/64.1 |

FOREIGN PATENT DOCUMENTS

| | | |
|---|---|---|
| EP | 0598594 A2 | 5/1994 |
| JP | 2000-268516 | 9/2000 |
| JP | 2001-189062 A * | 7/2001 |
| JP | 2001-189602 A | 7/2001 |
| JP | 2002-68516 A | 3/2002 |

OTHER PUBLICATIONS

Austrian Search Report dated Oct. 13, 2004 for Appln. No. 200401345-4.

* cited by examiner

*Primary Examiner*—David Hudspeth
*Assistant Examiner*—James L Habermehl
(74) *Attorney, Agent, or Firm*—Pillsbury Winthrop Shaw Pittman LLP (57) ABSTRACT

There is disclosed a disk drive using a disk medium in which a non-servo range exists. In order to position a head at a target track, a CPU executes a seek operation by normal velocity control using servo data. At this positioning, when the head passes the non-servo range from which no servo data can be obtained, the CPU executes a seek operation by special velocity control to move the head at a velocity calculated based on a moving distance of the non-servo range.

15 Claims, 5 Drawing Sheets

METHOD AND APPARATUS FOR HEAD POSITIONING USING SERVO CONTROL IN A DISK DRIVE

CROSS-REFERENCE TO RELATED APPLICATIONS

This application is based upon and claims the benefit of priority from prior Japanese Patent Application No. 2003-122347, filed Apr. 25, 2003, the entire contents of which are incorporated herein by reference.

BACKGROUND OF THE INVENTION

1. Field of the Invention

The present invention generally relates to disk drives, and particularly to servo control for head positioning using servo data.

2. Description of the Related Art

Heretofore, in a disk drive particularly typified by a hard disk drive, there has been incorporated a servo system in which servo data recorded on a disk medium is used to position a head at a target position on the disk medium. Here, the target position refers to a target track from which data is read out or on which data is written.

Generally, servo data is recorded on a disk medium by a servo track writer in a servo writing step included in a process of manufacturing a disk drive.

In the disk drive, the head is mounted on a rotary actuator and moved in a radial direction of the disk medium. Therefore, particularly in an inner peripheral or outer peripheral area of the disk medium, there arises a so-called skew angle which indicates an inclination of the head with respect to a data track (a track on which data is recorded).

In recent years, in a disk drive, track density on a disk medium has been more and more increased for high recording density. Such a background and the above-mentioned inclination of the head raise the possibility that low quality servo data is recorded in an erase area provided between adjacent data tracks in the servo writing step.

Accordingly, in the disk drive, when a head positioning operation is performed, the read head may read out the low quality servo data as noise from the erase area on the disk medium. The influence by this noise decreases accuracy of the head positioning operation.

In order to solve such a problem, there has been suggested a servo writing method of recording servo data in the inner peripheral area and the outer peripheral area of the disk medium separately instead of a method of concurrent servo writing on the whole area of the disk medium (for example, refer to Jpn. Pat. Appln. KOKAI Publication No. 2000-268516 or No. 2001-89062).

According to the servo writing method described in the literatures of the prior art, normal servo data is consequently overwritten in the erase area between the data tracks. In the erase area, therefore, low quality servo data is inhibited from being recorded.

However, in this method, unrecorded area of servo data equivalent to one to several tracks (referred to as a non-servo range) occurs in a middle peripheral area on the disk medium. Therefore a servo system using the servo data cannot acquire the servo data from the non-servo range, thereby having difficulty with the normal head positioning operation.

BRIEF SUMMARY OF THE INVENTION

In accordance with one embodiment of the present invention, there is provided a disk drive including facilities to perform a head positioning operation normally even when a non-servo range exists on a disk medium.

The disk drive comprises a disk medium including tracks each including a data area and a servo area, and a non-servo area composed of a track not including the servo area; a head configured to execute reading or writing of data with respect to the data area or reading of servo data from the servo area; an actuator to position the head at a target track on the disk medium; and a controller which drives and controls the actuator by first velocity control using the servo data read out from the servo area by the head so as to move the head to the target track, wherein, when the non-servo range is included in a moving range of the head, the controller executes second velocity control for the head to pass the non-servo range at a velocity calculated based on a moving distance of the non-servo range.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, embodiments of the present invention will be explained with reference to the drawings.

Figure 1:
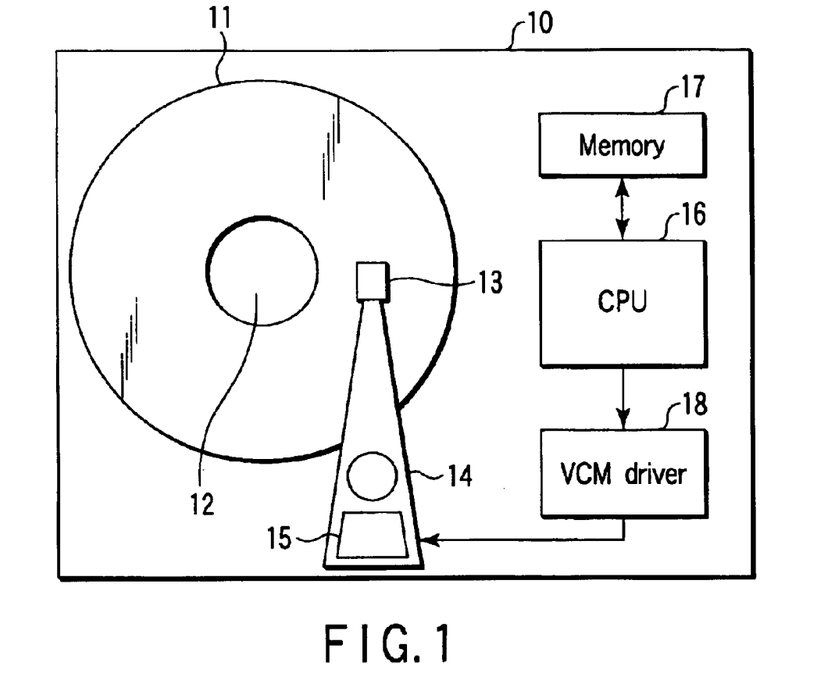
FIG. 1 is a block diagram showing a substantial part of a disk drive according to an embodiment of the present invention.
Figure 3:
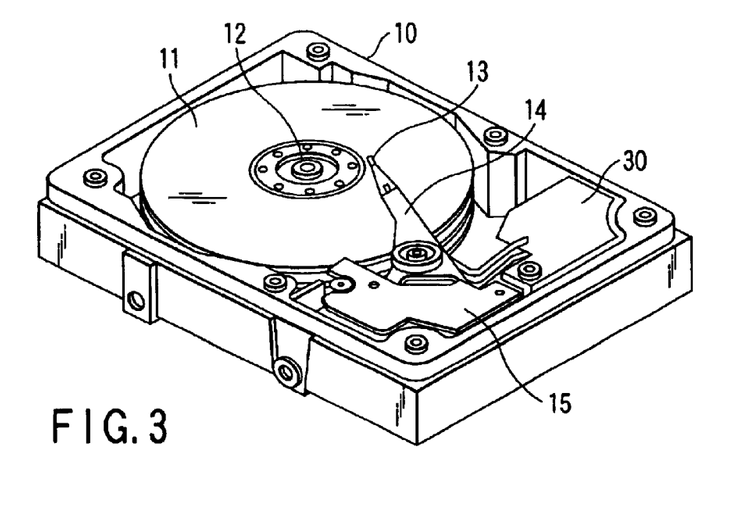
FIG. 3 is a view showing an appearance of the disk drive according to the present embodiment.

FIG. 1 is a block diagram showing a substantial part of a disk drive according to the present embodiment. FIG. 3 is a view showing an appearance of the disk drive.

(Constitution of Disk Drive)

A disk drive 10 is a hard disk drive applying, for example, a perpendicular magnetic recording method as shown in FIGS. 1 and 3, and a drive mechanism comprising a disk medium 11, a spindle motor (SPM) 12 and a rotary actuator 14 is incorporated therein.

On the actuator 14, a head 13 is mounted so as to move in a radial direction of the disk medium 11 (refer to an arrow 200 of FIG. 2) by driving force of a voice coil motor (VCM) 15.

In the head 13, a write head for writing data on the disk medium 11 and a read head for reading out data from the disk medium 11 are installed in the same slider.

Figure 2:
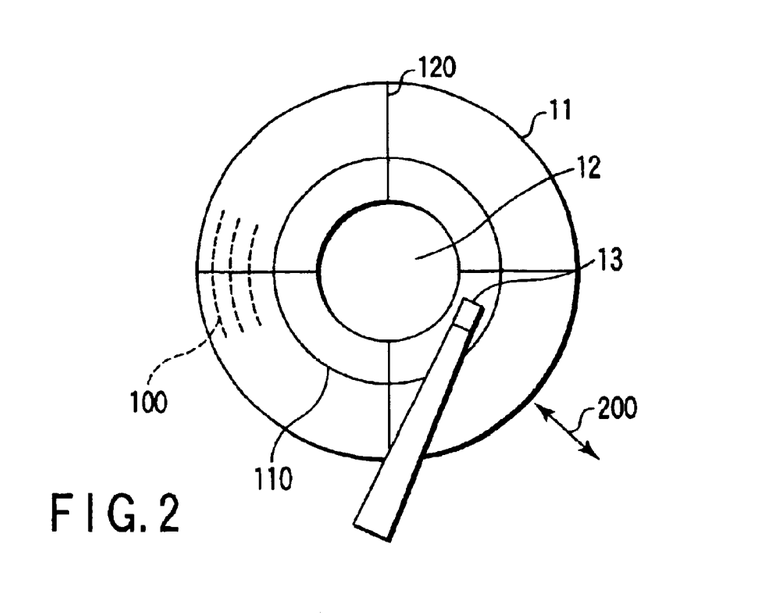
FIG. 2 is a diagram for explaining a data surface on a disk medium according to the present embodiment.

In the disk medium 11, as shown in FIG. 2, a number of tracks (cylinders) 100 are formed concentrically on both data surfaces (front surface and back surface). Each of the tracks 100 is provided with a plurality of servo areas 120 and data areas.

The servo areas 120 are areas on which servo data is recorded by a servo track writer (STW) in a servo writing step included in a process of manufacturing the drive. The servo areas 120 are arranged at predetermined intervals in a circumferential direction at the same position of each track.

The data areas are recording area of user data to be written by the write head, and typically divided into a plurality of data sectors to be managed.

Furthermore, on the disk medium 11, as described later, there exists a non-servo range 110 of, for example, several tracks on which no servo data is recorded in an almost middle peripheral area. This non-servo range 110 is stored in a system area of the disk medium 11 or a memory 17 as a defect area which is not used as an area for recording the user data.

Moreover, the disk drive 10 has a micro processor (CPU) 16, the memory 17 and a VCM driver 18, as shown in FIG. 1. In addition, as shown in FIG. 3, a circuit board 30 mounting a preamplifier circuit and the like is arranged. The circuit board 30 is connected to the head 13 via FPC (flexible printed cable) to transmit a read/write signal.

The CPU 16 is a main controller of the disk drive 10 and a main element of a servo system executing head positioning control. The CPU 16 drives and controls the actuator 14 based on the servo data read out by the read head included in the head 13, and positions the head 13 at a target track on the disk medium 11.

Specifically, the CPU 16 executes the head positioning operation by driving and controlling the VCM 15 via the VCM driver 18. The VCM driver 18 supplies driving current to the VCM 15 under the control of the CPU 16.

The memory 17 is made of, for example, a flash EEPROM, and stores defect information indicating the defect area (non-servo range) 110 according to the present embodiment. However, the defect information may be stored in the system area of the disk medium 11 together with normal defect information (information indicating a defective track).

(Non-Servo Range 110)

In the present embodiment, as described above, the disk drive 10 using the disk medium 11 in which the non-servo range (equivalent to the defect area) 110 exists is supposed.

The non-servo range 110 is a defect range of, for example, several tracks on which no servo data is recorded. Here, as shown in FIG. 6, the non-servo range 110 is from a track number N+1 to N+m. Hereinafter, a brief description of generation of the non-servo range 110 will be given with reference to FIGS. 4 and 5.

Figure 4:
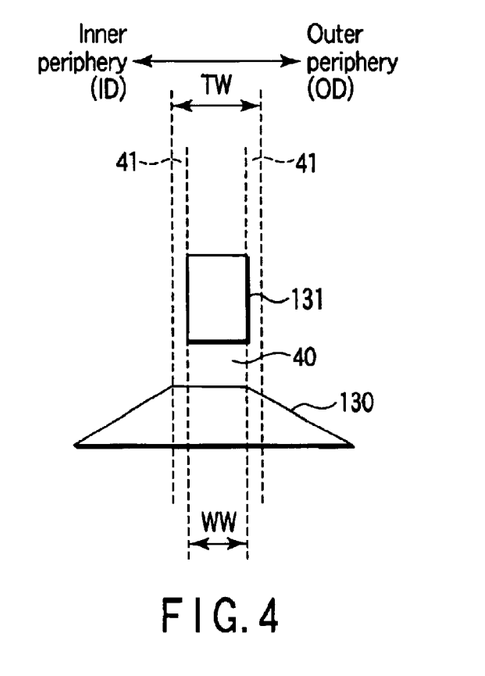
FIGS. 4 to 6 are diagrams for explaining a non-servo range according to the present embodiment.

Firstly, the head 13 has a leading magnetic pole 130 and a trailing magnetic pole 131 as shown in FIG. 4. Writing of data is performed by a recording magnetic field generated in the vicinity of a magnetic gap (write gap) of the trailing magnetic pole 131.

FIG. 4 shows a case where the head 13 is positioned about the middle periphery of the disk medium 11 and the skew angle is about 0 degree. That is, it is in the state that the trailing magnetic pole 131 is positioned approximately at the center of a data track 40 (with a track width TW). Incidentally, WW denotes a write width (or servo data width) with respect to the track width TW.

Here, since the recording magnetic field generated in the vicinity of the trailing magnetic pole 131 sneaks into the leading magnetic pole 130, the erase area 41 is formed on either side of the data track 40. Since the intensity of the applied recording magnetic field is insufficient, low quality data (servo data) is recorded on the erase area 41.

Figure 5:
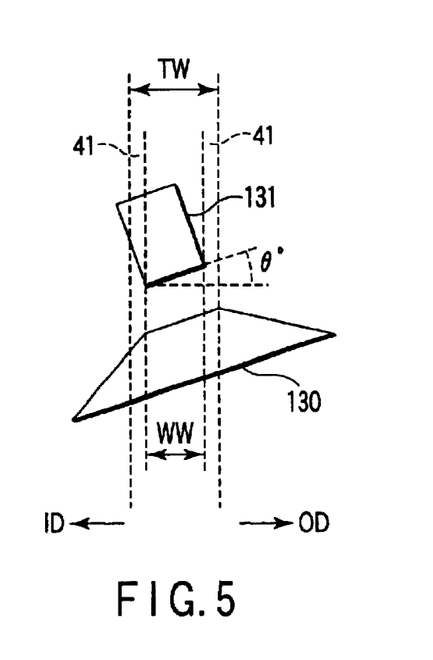
Figure 6:
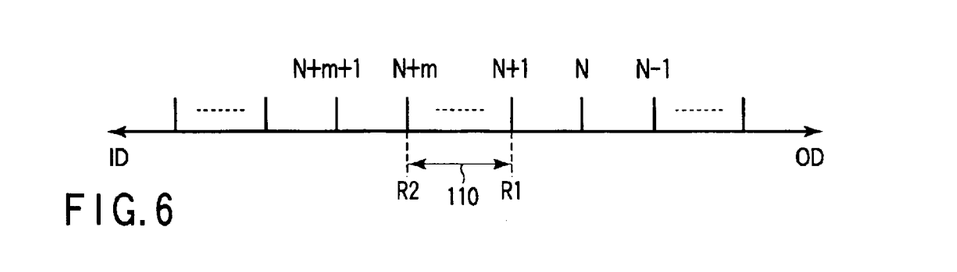

On the other hand, as shown in FIG. 5, when the head 13 is moving (seeking) in an inner peripheral direction (ID), the head 13 is inclined to the inner peripheral side and a skew angle ($\theta°$) occurs. At this time, the erase area 41 in an outer peripheral direction (OD) becomes large. That is, a width of the erase area 41 depends on the skew angle, so that as the absolute value of the skew angle becomes larger, the width of the erase area becomes larger.

In such a condition, when servo data is recorded on the disk medium 11, low quality servo data is recorded on the erase area 41. The read head, therefore, may reproduce the low quality servo data as noise from the erase area 41, consequently leading to deterioration of head positioning accuracy.

For these reasons, as shown in FIG. 6, the disk medium 11 in which the non-servo range (defect area) 110 exists in the vicinity of almost middle periphery is used. Since the non-servo range 110 is preset, the track number (from N+1 to N+m) and a radial position (from R1 to R2) are determined.

According to the present embodiment, the memory 17 stores the information (defect information) by which the non-servo range (defect area) 110 can be recognized. Accordingly, the CPU 16 can recognize the range of the non-servo range 110 from the memory 17 at the time of head positioning control.

(Head Positioning Operation)

Hereinafter, mainly referring to flow charts of FIGS. 6 to 8 and FIG. 10, a head positioning operation according to the present embodiment will be explained.

Here, the head positioning operation is roughly divided into a seek operation in which the head 13 is moved from a start position ST (or a current track Cc) to the vicinity of a target track DT (or target cylinder Ct), and a track following operation for positioning the head 13 in the range of the target track.

The CPU 16 uses a track number (also referred to as cylinder address) included in the servo data at the seek operation. Specifically, the CPU 16 recognizes the start position ST from the reproduced track number and calculates a moving distance to the target track DT. The CPU 16 determines a velocity profile of the head 13 (actually, the VCM 15) from the calculated moving distance to execute moving velocity control (conveniently referred to as first velocity control) of the head 13.

Figure 10:
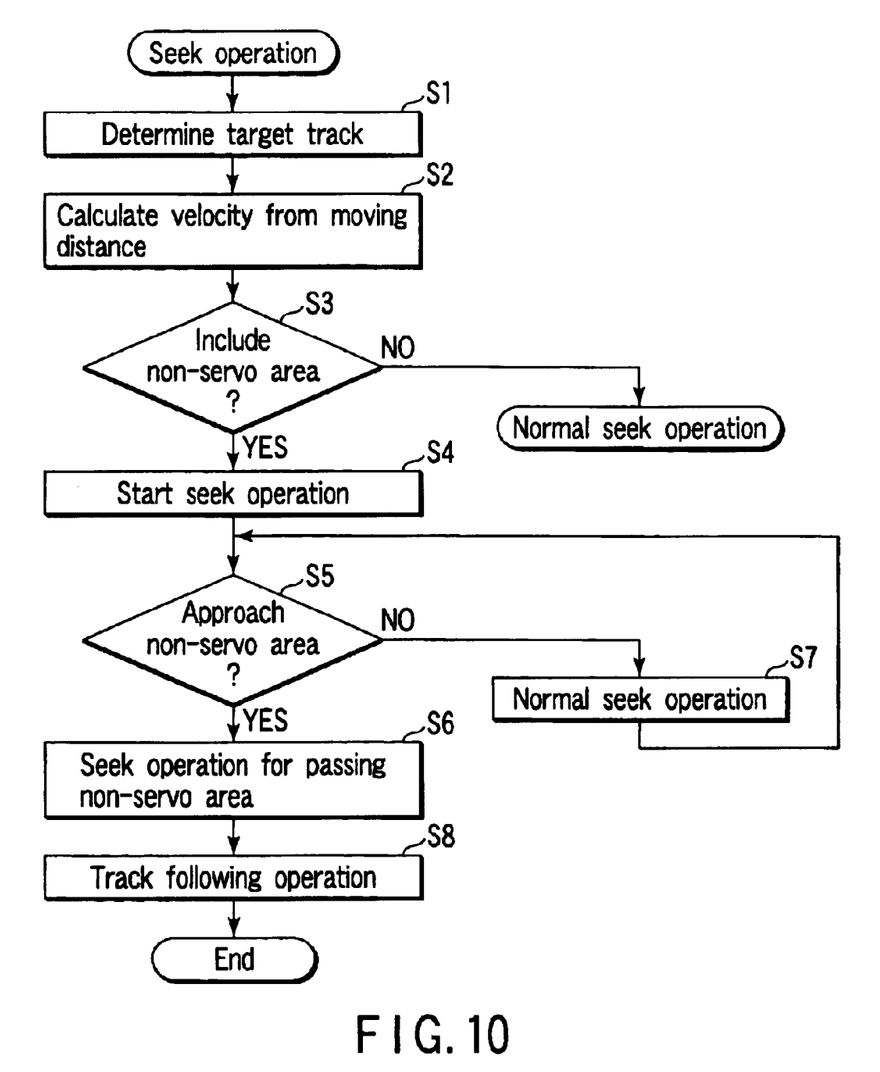
FIG. 10 is a flow chart for explaining the seek operation according to the present embodiment.

With reference to the flow chart of FIG. 10, the steps of the seek operation in which the head 13 is moved to the vicinity of the target track DT will be explained.

Firstly, the CPU 16 determines the target track DT to be accessed on the disk medium 11 (step S1). Next, the CPU 16 calculates the moving distance from the start position (current track) ST to the target track DT to determine a moving velocity of the head 13 (step S2).

Figure 7:
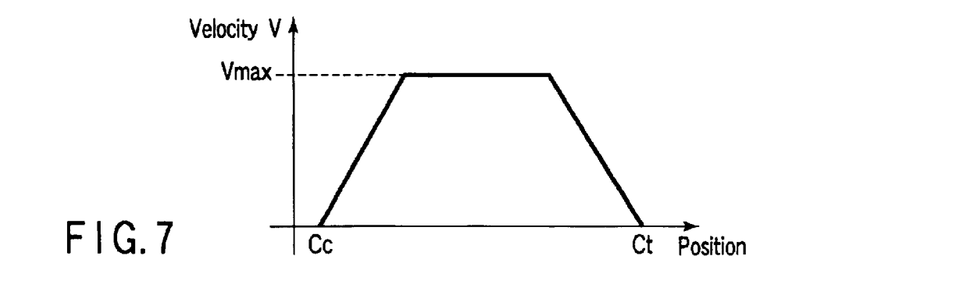
FIG. 7 is a diagram for explaining velocity control according to the present embodiment.

Specifically, the CPU 16 determines the velocity profile as shown in FIG. 7. The velocity profile shows an increase, constancy and decrease in velocity in moving from the current track (current cylinder Cc) which is the start position ST to the target track (target cylinder Ct) (wherein Vmax indicates a maximum velocity value).

The CPU 16, with the movement of the head 13, updates the moving velocity according to a reproduction cycle of the servo data (track number) read out from the read head (the first velocity control). The reproduction cycle is determined by a formula expressed by T/S, wherein T represents a rotation time of the disk medium 11 and S represent a number of the servo areas (servo sectors).

Here, in the case where the above-mentioned non-servo range 110 is not included in the moving range up to the target track, the CPU 16 executes the normal seek operation by the first velocity control updating the moving velocity of the head 13, while acquiring the servo data from the servo areas of the respective tracks (NO in step S3).

Figure 8:
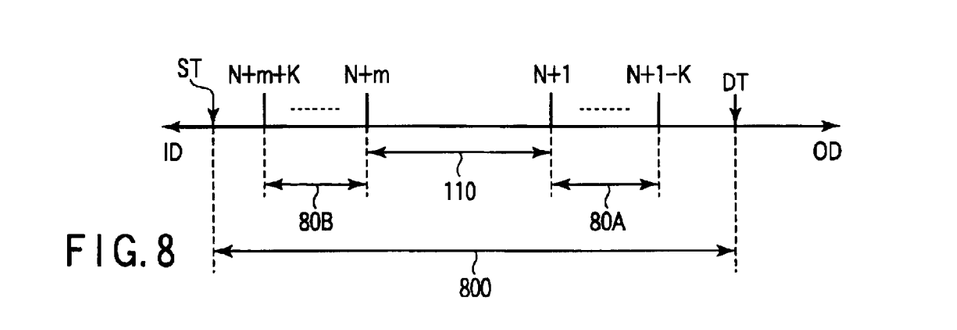
FIG. 8 is a diagram for explaining a seek operation according to the present embodiment.

On the other hand, as shown in FIG. 8, in the case where the non-servo range 110 is included in the moving range up to the target track DT, the CPU 16 starts a seek operation in the state incapable of acquiring the servo data from the non-servo range 110 (YES in step S3: S4).

According to the present embodiment, the CPU 16 can beforehand recognize the non-servo range 110 in which no servo data can be acquired. Furthermore, the CPU 16 sets non-data track areas 80A and 80B in ranges of several tracks adjacent to the non-servo range 110 in the inner peripheral direction (ID) and the outer peripheral direction (OD).

Specifically, the non-data track areas 80A and 80B are stored as specific defect areas, for example, in the memory 17. The non-data track areas 80A and 80B are used not as recording areas of user data but for reproducing only the servo data. Accordingly, they are registered as a kind of defect areas.

The CPU 16, when the non-servo area 110 is approached with the movement of the head 13, executes the seek operation for passing the non-servo range 110 based on the servo data reproduced from the non-data track areas 80A and 80B (YES in step S5: S6). Here, before the non-servo range 110 is approached, naturally, the CPU 16 continues the normal seek operation (NO in step S5: S7).

According to the present embodiment, as shown in FIG. 8, a case where the head 13 is moved from the inner peripheral side (ID) to the outer peripheral side (OD) is supposed (800). The CPU 16 determined a velocity for passing the non-servo range 110 based on the servo data obtained from the non-data track area 80B, and according to the velocity, executes velocity control (conveniently referred to as second velocity control) of driving and controlling the actuator 14.

Since no servo data cannot be acquired from the non-servo range 110, the velocity update (the first velocity control) in the normal seek operation cannot be executed. Accordingly, the CPU 16 calculates the moving velocity by the second velocity control to execute the seek operation only when the head 13 passes the non-servo range 110.

Here, the CPU 16 executes the second velocity control in which the velocity at which the head 13 passes the non-servo range 110 is calculated according to a maximum velocity limited at advance and a moving distance of the head 13 corresponding to the non-servo range 110. The moving distance of the head 13 corresponding to the non-servo range 110 is calculated using the servo data obtained from the non-data track area 80B.

When the head 13 passes the non-servo range 110 and reaches the non-data track area 80A, the CPU 16 acquires the servo data from the area 80A to restart the normal seek operation with the velocity update by the first velocity control.

When the head 13 reaches the target track DT, the CPU 16 shifts to normal track following control (step S8). In step S3, even in the case where the normal seek operation is executed, naturally, the CPU 16 also shifts to the normal following control when the head 13 reaches the target track DT.

To put it briefly, according to the present embodiment, the head passes the non-servo range as a defect area at the velocity calculated by the second velocity control in the head positioning operation in which the head is positioned at the target track on the disk medium.

In other words, in the case where the seek operation on the disk medium 11 in which the non-servo range 110 exists is executed, the special seek operation for passing the non-servo range 110 in which no servo data can be obtained is executed.

In this case, the servo data reproduced from the non-data track areas 80A and 80B is used to execute the seek operation for passing the non-servo range 110 at an arbitrary velocity. The non-data track areas 80A and 80B are areas used only for reproducing the servo data, not used as areas for recording normal user data. Accordingly, the CPU 16 never sets the target track in the ranges of the non-data track areas 80A and 80B.

Since no servo data can be obtained from the non-servo range 110, the CPU 16 cannot execute the moving velocity control in the non-servo range 110 by feedback control. Accordingly, the CPU 16 executes the seek operation at an arbitrary velocity in the non-servo range 110. Furthermore, immediately after passing the non-servo range 110, it is difficult to position the head 13 at the target track set in the ranges of the non-data track areas 80A and 80B with high accuracy. Accordingly, in the non-data track areas 80A and 80B, which are not used as data areas, the target track is not set.

In the normal seek operation not employing the method according to the present embodiment, since the servo data cannot be obtained continuously when the head passes the non-servo range 110, generally, the feedback control is disabled, thereby ceasing the normal head positioning operation.

Furthermore, in the method according to the present embodiment, the defect information indicating the non-servo range 110 as a defect area is registered (in the memory 17 or the system area on the disk medium 11). Accordingly, in a defect check step included in the process of manufacturing the disk drive 10, the non-servo range 110 is registered as a defect area, so that a data address (sector address) expected to be assigned to the area is naturally slipped to another track area.

By the way, the CPU 16 sets a formula expressed by $(R1-R2)/V_{max}$ as the velocity when the head 13 passes the non-servo range 110. Thereby, even when the servo data cannot be reproduced, the moving velocity is made constant to thereby avoid the runaway of the head 13.

(Another Embodiment)

Figure 9:
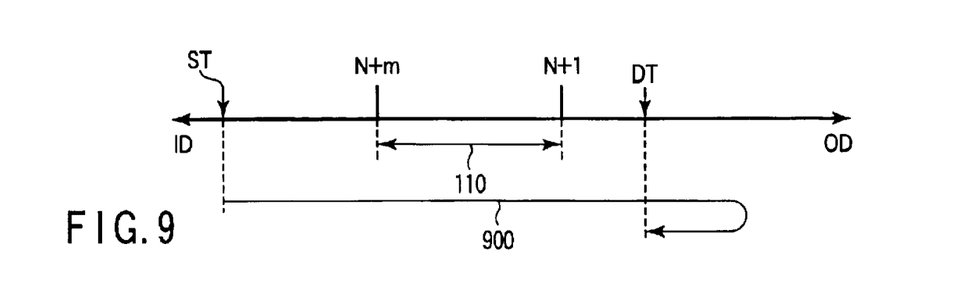
FIG. 9 is a diagram for explaining a seek operation according to another embodiment.
Figure 11:
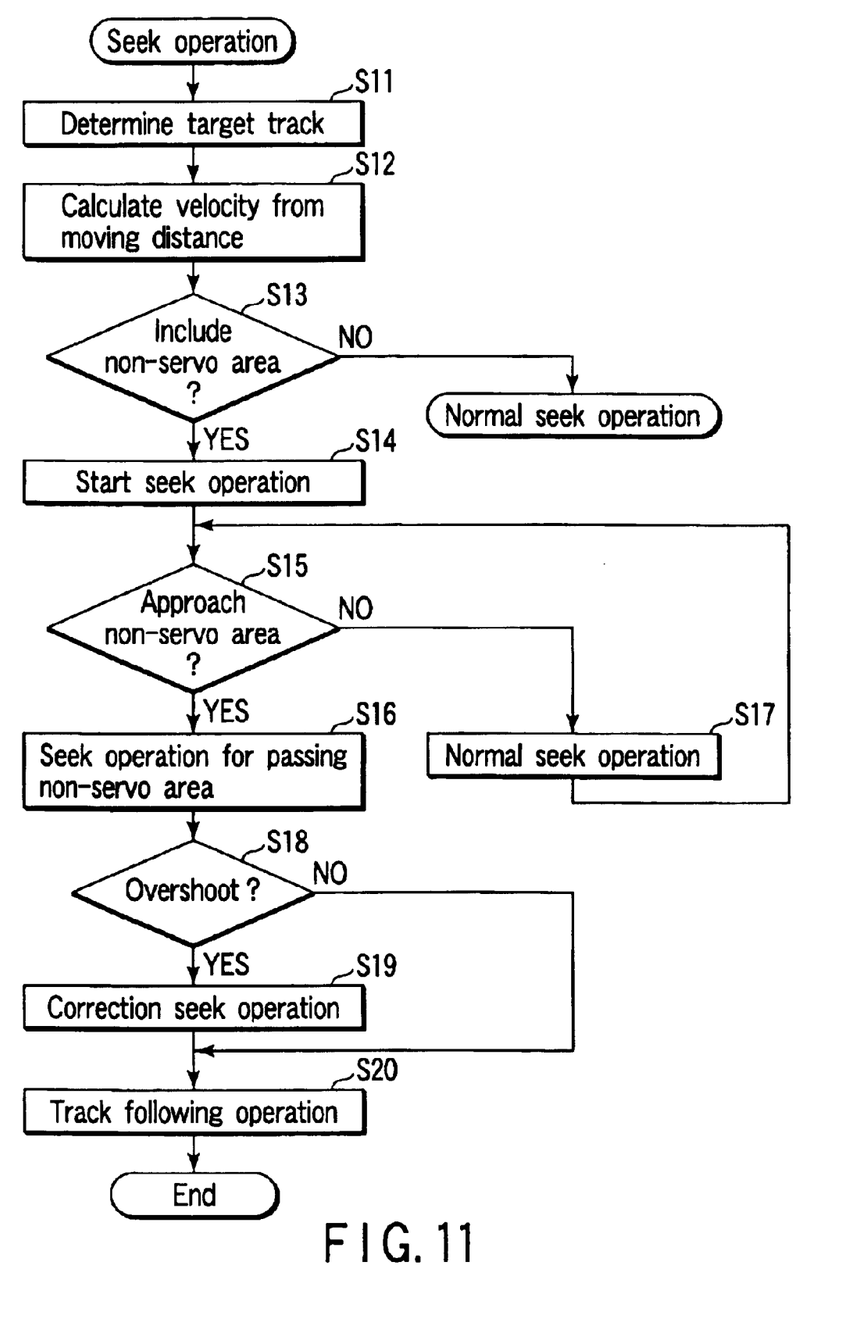
FIG. 11 is a flow chart for explaining the seek operation according to the above-mentioned another embodiment.

FIGS. 9 and 11 are diagrams according to another embodiment of the invention.

According to this embodiment, there is provided a method of executing the seek control for passing the non-servo range 110 in which no servo data can be obtained without setting the non-data track area 80A and 80B. Hereinafter, a concrete description will be given.

Firstly, the CPU 16 determines the target track DT to be accessed on the disk medium 11 (step S11). Next, the CPU 16 calculates a moving distance from the start position (current track) ST to the target track DT to determine a moving velocity of the head 13 (step S12). This velocity determining method is similar to that of the above-mentioned embodiment (refer to FIG. 7).

Here, in the case where the above-mentioned non-servo range 110 is not included in the moving range to the target track, the CPU 16 executes the normal seek operation in which the moving velocity of the head 13 is controlled while acquiring the servo data from the servo areas of the respective tracks (NO in step S13).

On the other hand, as shown in FIG. 9, in the case where the non-servo range 110 is included in the moving range to the target track DT, the CPU 16 starts the seek operation in the state incapable of acquiring the servo data from the non-servo range 110 (YES in step S13: S14). However, the CPU 16 executes the normal seek operation before the head 13 approaches the non-servo range 110 (NO in step S15: S17).

The CPU 16, when the non-servo area 110 is approached with the movement of the head 13, executes the seek operation for passing the non-servo range 110 at an arbitrary velocity based on the servo data obtained from a track immediately before the range (YES in step S15: S16). The CPU 16 sets, for example, the formula expressed by (R1–R2)/Vmax as a velocity when the head 13 passes the non-servo range 110.

Here, as shown in FIG. 9, the head 13 may overshoot the target track DT with the movement of passing the non-servo range 110 (YES in step S18). This is because the servo data cannot be obtained from the non-servo range 110 and thereby the field back control (velocity update) cannot be employed. In addition, unlike the case as shown in FIG. 8 according to the above-mentioned embodiment, since the non-data track areas 80A and 80B do not exist, the target track may be close to the non-servo range 110.

The CPU 16, when recognizing the overshooting based on the servo data obtained from a track after passing the non-servo range 110, shifts to a correction seek operation for moving in the opposite direction (step S19). In short, the CPU 16 restarts the seek operation in the opposite direction (individually, from the outer peripheral direction to the inner peripheral direction) from an arbitrary track reached by the overshooting.

When the head 13 reaches the target track DT, the CPU 16 shifts to the normal track following operation (step S20). Here, in the case where the seek operation can be finished after the head 13 passes the non-servo range 110 and before the head 13 overshoots the target track DT, the CPU 16 naturally shifts to the normal operation (NO in step S18: 20).

To put it briefly, in the case where the head 13 overshoots the target track DT after passing the non-servo range 110, the correction seek operation in which the seek operation in the opposite direction is executed is executed. Accordingly, as compared to the method shown in FIG. 10 according to the above-mentioned embodiment, the seek time is longer, while it is not necessary to set the non-data track areas 80A and 80B adjacent to the non-servo range 110, thereby preventing the defect area occurring on the disk medium 11 from increasing.

As described above, in the disk drive 10 using the disk medium 11 in which the non-servo range 110 exists, the seek control for passing at an arbitrary velocity the non-servo range 110 from which no servo data can be obtained is executed. Accordingly, the runaway of the head 13 can be avoided and the head 13 is securely positioned at the target track on the disk medium 11.

In other words, in the disk drive in which the non-servo range exists on the disk medium, the head positioning operation can be normally executed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive comprising:

a disk medium including tracks each including a data area and a servo area, and a non-servo area composed of a track not including the servo area;

a head configured to execute reading or writing of data with respect to the data area or reading of servo data from the servo area;

an actuator to position the head at a target track on the disk medium; and a controller which drives and controls the actuator by first velocity control using the servo data read out from the servo area by the head so as to move the head to the target track, wherein in the case where the non-servo range is included in a moving range of the head, the controller executes second velocity control for the head to pass the non-servo range at a velocity calculated based on a moving distance of the non-servo range.

2. The disk drive according to claim 1, further comprising:

a storage unit having stored therein information for identifying the non-servo range, wherein the controller determines whether or not the non-servo range is included in the moving range of the head according to the information.

3. The disk drive according to claim 1, wherein, on the disk medium, non-data track areas are set with respect to tracks adjacent to the non-servo range, the non-data track areas being disabled to use the data area but enabled to read out the servo data from the servo area.

4. The disk drive according to claim 3, further comprising:

a storage unit having stored therein information for identifying the non-data track areas, wherein the controller identifies the non-data track areas according to the information.

5. The disk drive according to claim 1, wherein the controller executes the second velocity control in which the moving velocity of the head for passing the non-servo range is calculated using the servo data obtained from the servo area included in a track adjacent to or in the vicinity of the non-servo range.

6. The disk drive according to claim 1, wherein the controller sets the non-data track areas with respect to the tracks adjacent to the non-servo range, the non-data track areas being disabled to use the data area but enabled to read out the servo data from the servo area, and executes the second velocity control in which the moving velocity of the head for passing the non-servo range is calculated using the servo data obtained from the servo area of each of the non-data track areas.

7. The disk drive according to claim 1, wherein the controller executes the second velocity control in which the moving velocity of the head for passing the non-servo range is calculated using the servo data obtained from the servo area included in the track adjacent to or in the vicinity of the non-servo range, and when the head overshoots the target track with the seek operation by the second velocity control, the controller drives and controls the actuator so as to move the head up to the target track based on the servo data.

8. The disk drive according to claim 1, wherein, when the head overshoots the target track with the seek operation by the second velocity control, the controller positions the head at a current track at which the head is located or a track in the vicinity thereof based on the servo data read out from the current track, and drives and controls the actuator so as to restart the seek operation for the target track using the track at which the head is positioned as a seek start position.

9. The disk drive according to claim 1, wherein, when the head passes the non-servo range, the controller calculates the velocity required for the seek operation according to the seek start position calculated based on the servo data obtained immediately before passing and a moving distance calculated based on a distance of the non-servo range; and drives and controls the actuator so as to move the head at the calculated velocity.

10. A method of head positioning in a disk drive having a disk medium including tracks each including a data area and a servo area, and a non-servo area composed of a track not including the servo area; and a head configured to execute reading or writing of data with respect to the data area or reading of servo data from the servo area, the method comprising:

setting a target track on the disk medium;

determining whether or not the non-servo range is included in a range of moving the head up to the target track;

when the non-servo range is not included, executing a seek operation by first velocity control in which the head is moved to the target track using the servo data; and when the non-servo range is included, executing a seek operation by second velocity control for the head to pass the non-servo range at a velocity calculated based on a moving distance of the non-servo range.

11. The method according to claim 10, wherein, in the execution of the second velocity control, the moving velocity of the head for passing the non-servo range is calculated using the servo data from the servo area included in a track adjacent to or in the vicinity of the non-servo range.

12. The method according to claim 10, wherein, on the disk medium, non-data track areas are set with respect to tracks adjacent to the non-servo range, the non-data track areas being disabled to use the data area but enabled to read out servo data from the servo area, and in the execution of the second velocity control, the moving velocity of the head for passing the non-servo range is calculated using the servo data from the servo area included in each of the non-data track areas.

13. The method according to claim 10, further comprising:

when the head overshoots the target track with the seek operation by the second velocity control, executing a correction seek operation in which the head is moved to the target track.

14. The method according to claim 10, further comprising:

when the head overshoots the target track with the seek operation by the second velocity control, positioning the head at a current track at which the head is located or a track in the vicinity thereof based on the servo data read out from the current track; and restarting the seek operation for the target track using the track at which the head is positioned as a seek start position.

15. The method according to claim 10, wherein, when the head passes the non-servo range by the execution of the second velocity control, the velocity required for the seek operation is calculated according to the seek start position calculated based on the servo data obtained immediately before passing and the moving distance calculated based on the distance of the non-servo range.

* * * * *